United States Patent
Bhongale et al.

(10) Patent No.: US 10,408,049 B2
(45) Date of Patent: Sep. 10, 2019

(54) DOWNHOLE TELEMETRY USING ADAPTIVE FEEDBACK

(71) Applicant: HALLIBURTON ENERGY SERVICES, INC., Houston, TX (US)

(72) Inventors: Satyan Gopal Bhongale, Cypress, TX (US); Daniel Joshua Stark, Houston, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 28 days.

(21) Appl. No.: 15/304,415

(22) PCT Filed: Dec. 3, 2015

(86) PCT No.: PCT/US2015/063787
§ 371 (c)(1),
(2) Date: Oct. 14, 2016

(87) PCT Pub. No.: WO2017/095427
PCT Pub. Date: Jun. 8, 2017

(65) Prior Publication Data
US 2018/0016893 A1    Jan. 18, 2018

(51) Int. Cl.
*E21B 47/12* (2012.01)
*H04B 10/50* (2013.01)
(Continued)

(52) U.S. Cl.
CPC ............ *E21B 47/123* (2013.01); *E21B 47/12* (2013.01); *H04B 10/50577* (2013.01); *H04B 10/63* (2013.01); *H04B 10/697* (2013.01)

(58) Field of Classification Search
CPC ............ E21B 47/123; H04B 10/50577; H04B 10/697
See application file for complete search history.

(56) References Cited

U.S. PATENT DOCUMENTS

| 4,455,529 A | 6/1984 | Sinclair |
| 6,329,929 B1 | 12/2001 | Weijand et al. |

(Continued)

FOREIGN PATENT DOCUMENTS

| GB | 2412737 A | 10/2005 |
| WO | 2013191686 A1 | 12/2013 |
| WO | 2015171135 A1 | 11/2015 |

OTHER PUBLICATIONS

International Search Report and Written Opinion; PCT Application No. PCT/US2015/063787; dated Aug. 16, 2016.

(Continued)

*Primary Examiner* — Nader Bolourchi
(74) *Attorney, Agent, or Firm* — Polsinelli PC

(57) ABSTRACT

Systems, methods, and computer-readable media for providing adaptive feedback in downhole telemetry in a wellbore. A feedback system includes a source assembly, which can be located on the surface or downhole, and a receiving assembly, which can likewise be located on the surface or downhole. The source assembly includes a source device that transmits a light signal having a first phase, and an encoder coupled to the source device. The receiving assembly comprising an oscillator that transmits an oscillator having a second phase, a coupler that couples the light signal with the oscillator signal, a detector and difference amplifier that detect and determine the difference between the first phase and second phase and a processor that receives the difference between the phases and provides the difference to an encoder so that the encoder can adjust the oscillator phase.

18 Claims, 7 Drawing Sheets

(51) Int. Cl.
*H04B 10/69* (2013.01)
*H04B 10/63* (2013.01)

(56) References Cited

U.S. PATENT DOCUMENTS

| | | | |
|---|---|---|---|
| 8,050,351 B2 | 11/2011 | Cho et al. | |
| 8,354,867 B2 | 1/2013 | Lu et al. | |
| 8,532,590 B2 | 9/2013 | Mayer et al. | |
| 2008/0285041 A1 | 11/2008 | Ocelic et al. | |
| 2009/0142069 A1 | 6/2009 | Wree et al. | |
| 2012/0224862 A1* | 9/2012 | Liu | H04B 10/5161 398/152 |
| 2013/0333872 A1* | 12/2013 | McMillon | E21B 23/00 166/66.5 |
| 2017/0146686 A1* | 5/2017 | Bhongale | G01D 5/35338 |

OTHER PUBLICATIONS

H. M. Wiseman and R. B. Killip; "Adaptive single-shot phase measurements: The full quantum theory" ; Phys. Rev. A 57, 2169 ;Published Mar. 1, 1998.

H. M. Wiseman and R. B. Killip; "Adaptive single-shot phase measurements: A semiclassical approach"; Phys. Rev. A 56, 944; Published Jul. 1, 1997.

Michael A. Armen, John K. Au, John K. Stockton, Andrew C. Doherty, and Hideo Mabuchi; "Adaptive Homodyne Measurement of Optical Phase"; Phys. Rev. Lett. 89, 133602; Published Sep. 4, 2002.

\* cited by examiner

DOWNHOLE TELEMETRY USING ADAPTIVE FEEDBACK

CROSS-REFERENCE TO RELATED APPLICATIONS

This application is a national stage entry of PCT/US2015/063787 filed Dec. 3, 2015, said application is expressly incorporated herein in its entirety.

TECHNICAL FIELD

The present technology pertains to downhole telemetry and more specifically to downhole optical telemetry using adaptive feedback.

BACKGROUND

In downhole telemetry, several factors can contribute to the degradation of the signal quality. For example, temperature, phase noise or strains in the fiber can add attenuation to the communication lines and signals carried therein when performing downhole telemetry. Further, if downhole for a long period of time and in such hot environments, the hydrogen present downhole can interact with the cables, such as fiber cables, used for the communication lines. The hydrogen can react with the silicon oxide and undesirably induce attenuation in the cable line.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1A:
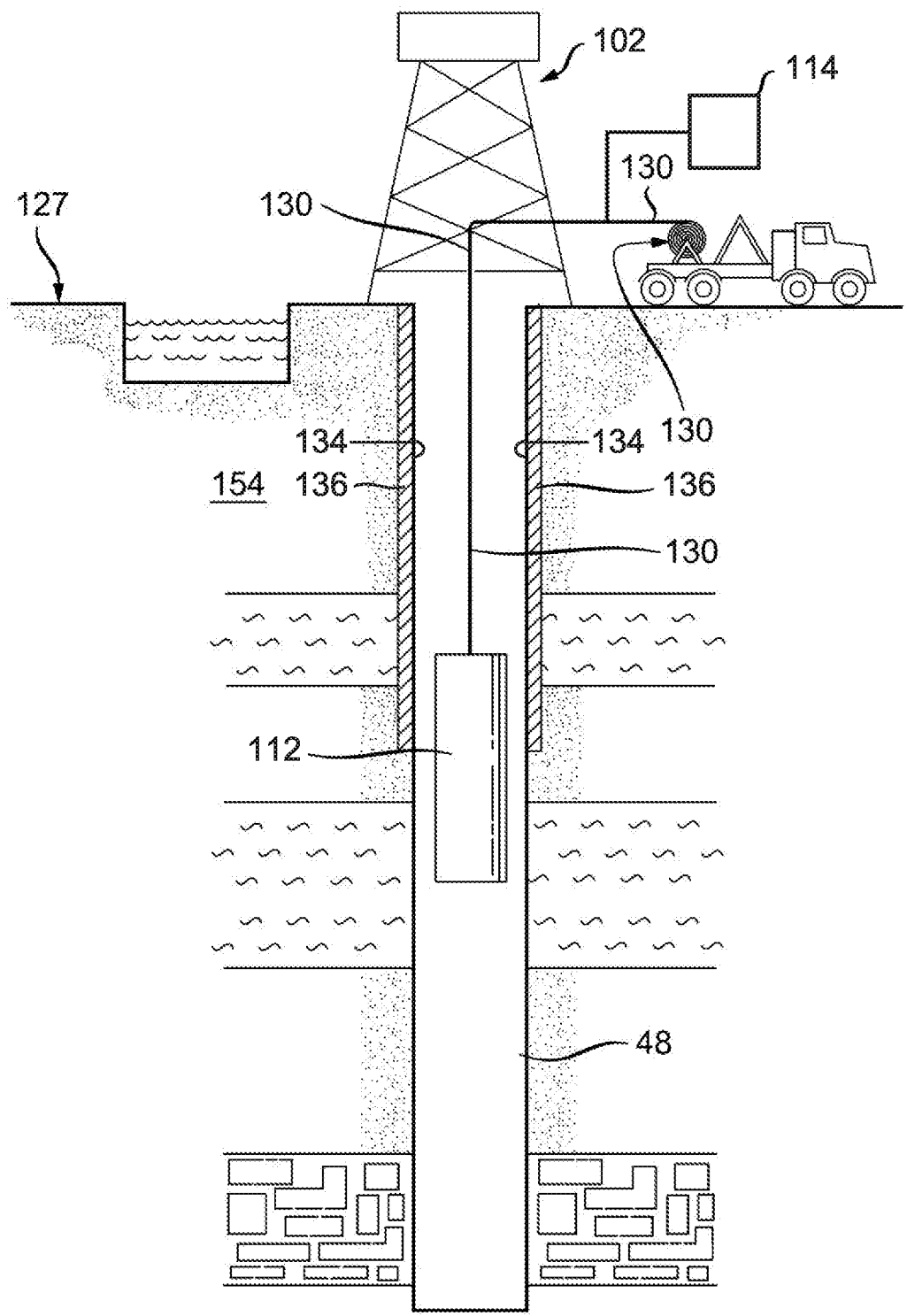
FIG. 1A illustrates a schematic diagram of an example system for telemetry using adaptive feedback for a wireline system.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially rectangular means that the object in question resembles a rectangle, but can have one or more deviations from a true rectangle. The phrase "wellbore tubular" is defined as one or more types of connected tubulars as known in the art, and can include, but is not limited to, tubing, production tubing, jointed tubing, coiled tubing, casings, liners, drill pipe, landing string, combinations thereof, or the like. The term "transceiver" is defined as a combination of a transmitter/receiver in one package but can include a separate transmitter and a separate receiver in one package or two packages.

In downhole applications, several factors can cause degradation in signal quality and/or cause attenuation in the lines. It is desirable to be able to improve the signal detection and estimation and improve the signal to noise ratio by providing an adaptive feedback in downhole optical telemetry. In downhole sensing and telemetry, phase changes can oftentimes be abrupt. By taking a measurement that integrates a phase value over a defined period of time, rather than a straight comparison of one value compared to another, abrupt changes can be captured with the exemplary embodiments of the present disclosure. In this manner, by integrating phase over time, the changes in phase are averaged out, so any abrupt changes are captured and added into the average. Therefore, any single instance of an abrupt phase change will not skew the measurements.

The adaptive feedback system disclosed herein can be implemented in various wellbore environments and phases of producing a well. For example, subsequent initial drilling of a wellbore, various tool assemblies can be provided downhole via wireline for sensing various characteristics formation properties. Fiber optic cable can be provided with the wireline conveyance which disposes the tool assembly downhole for implementing optical telemetry. Additionally, various tubulars may be provided downhole for production or delivery of fluids downhole. Fiber optic cable can also be provided with such tubulars, internally or externally, for telemetry as disclosed herein. In some cases, the adaptive feedback system disclosed telemetry as disclosed herein can also be implemented during drilling by providing fiber optic cable with a drill string.

An exemplary downhole wellbore environment for implementation in a wireline system is illustrated in FIG. 1A. As illustrated in FIG. 1A, a downhole tool unit 112 can be employed with wireline systems in order to carry out logging, or other sensing and detecting operations. The collected data can include such properties as formation rock properties, fluid density, temperature, pressure, resistivity, or porosity, among other characteristics and properties in a downhole environment. A downhole tool unit 112 can be lowered into the wellbore 48 of formation 154 by wireline conveyance 130 as shown in FIG. 1A. A casing 134 can be secured within the wellbore 48 by cement 136. The wireline conveyance 130 can be anchored in the rig 102 or portable or mobile units such as a truck. The illustrated wireline conveyance 130 provides support for the tool, as well as enabling communication between the tool processors on the surface 127 outside the wellbore 48 and providing a power supply. The wireline conveyance 130 can be one or more wires, wireline, slickline, cables, tubulars, or the like. The wireline conveyance 130 can include fiber optic cabling for carrying out communications. The optical cable can be provided internal or external of the conveyance 130. The wireline conveyance 130 is sufficiently strong and flexible to tether the downhole tool unit 112 through the wellbore 48, while also permitting communication through the wireline conveyance 130 to surface tools unit 114. Additionally, power can be supplied via the wireline conveyance 130 to meet power requirements of the tool.

Figure 1B:
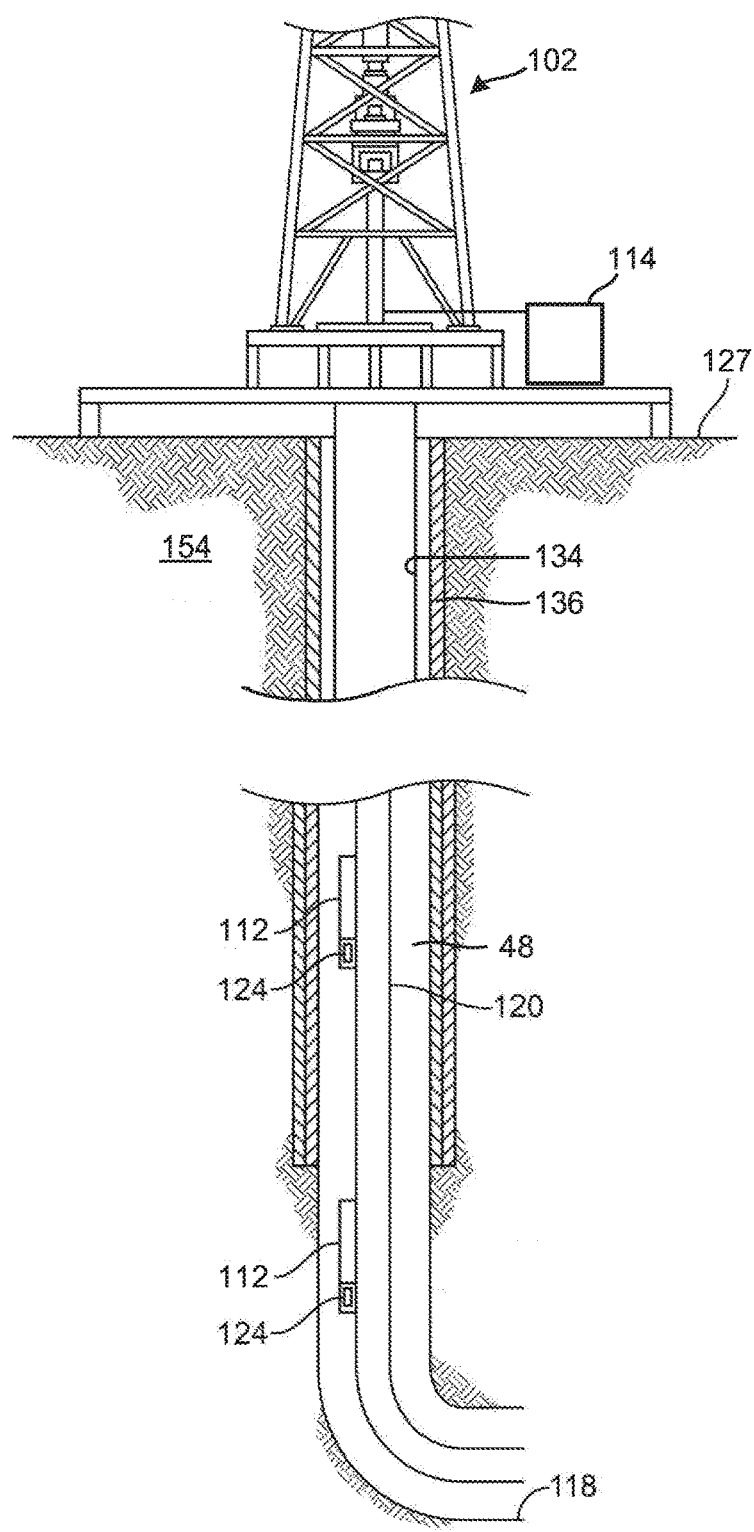
FIG. 1B illustrates a schematic diagram of an example system for telemetry using adaptive feedback for a downhole environment having tubulars.

An additional downhole wellbore environment for implementation of the adaptive feedback system disclosed herein is illustrated in FIG. 1B. As shown, the operating environment includes a rig 102 that is positioned on the earth's surface 127 and extends over and around a wellbore 48 that penetrates a subterranean formation 154 for the purpose of recovering hydrocarbons. As shown, the wellbore 48 may extend substantially vertically away from the earth's surface 127 and then transitions to a horizontal wellbore portion 118. The wellbore can include a wellbore casing 134, which can be cemented into place in at least a portion of the wellbore 48.

A wellbore tubular 120 can be lowered into the subterranean formation 154 for a variety of drilling, completion, workover, treatment, and/or production processes throughout the life of the wellbore. The wellbore tubular 120 can include those provided in the wellbore during completion operations, where hydrocarbon is withdrawn through the wellbore tubular 120 from producing formations. The wellbore tubular 120 can operate in any of the wellbore orientations (e.g., vertical, deviated, horizontal, and/or curved) and/or types described herein.

One or more downhole tools unit 112 can be coupled with the wellbore tubular 120 within the wellbore 48. One or more telemetry units 124 can be coupled with the wellbore tubular 120 within the wellbore 48. Typically, the one or more downhole tools unit 112 and the one or more telemetry units 124 are coupled on the outside of the wellbore tubular 120 using one or more straps or other means known to one of ordinary skill in the art. Each downhole tools unit 112 is communicatively coupled with one or more telemetry units 124. For example, fiber optic cable can be provided along the length of the tubular 120 and couple the tool assemblies for communication to and from the surface 127. Each downhole tools unit 112 can have a corresponding telemetry unit 124 and/or a single telemetry unit can communicate with one or more downhole tools unit 112. Often, performing an operation in the wellbore 48 can require a plurality of different downhole tools. For example, in the completion of a well, a sampling device can sometimes be deployed downhole to collect hydrocarbon samples in a production zone.

Figure 2:
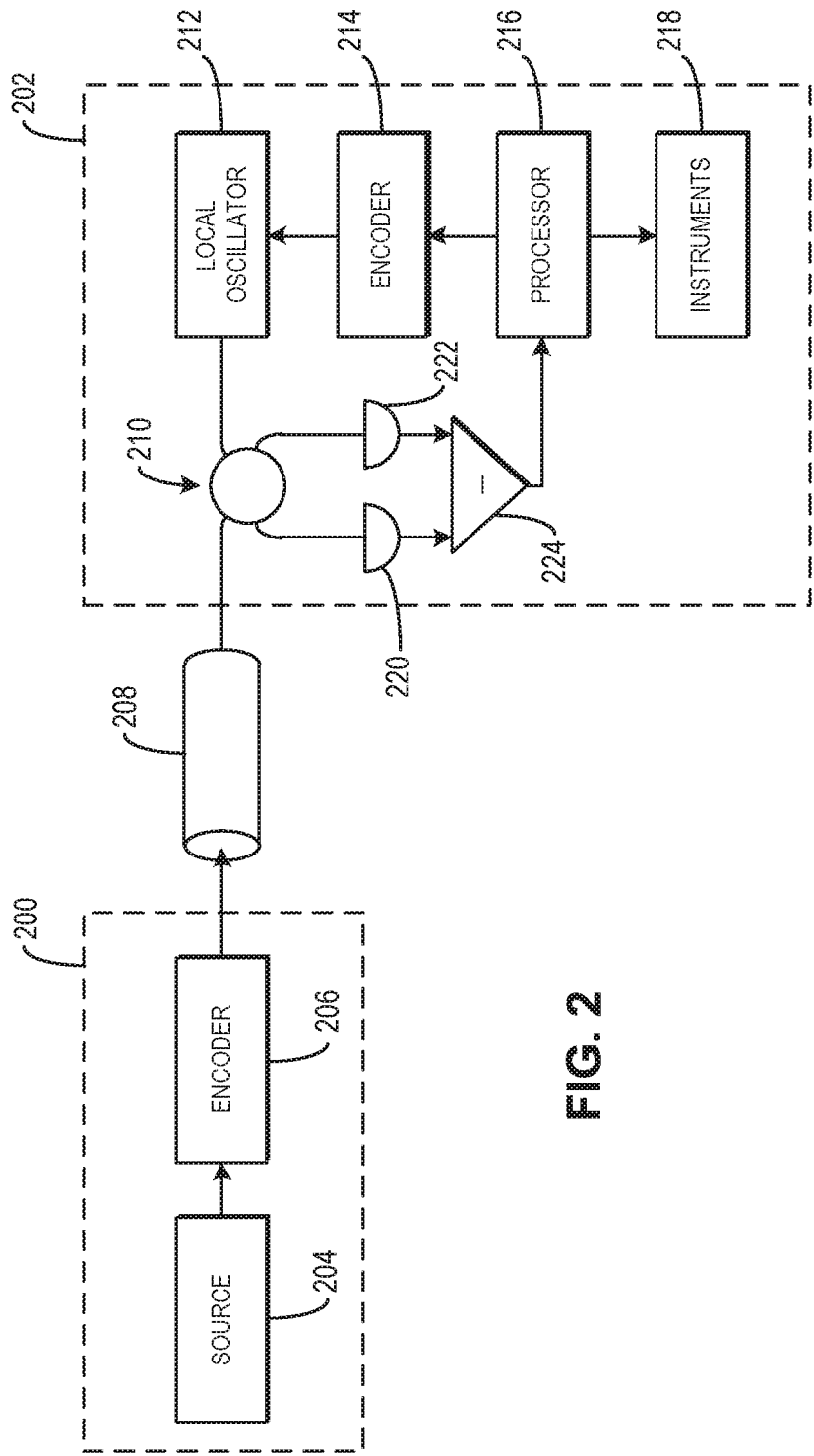
FIG. 2 illustrates a schematic diagram of the source and receiver components in an example telemetry system using adaptive feedback.

To communicate data to the surface tools unit 114, downhole tools unit 112 can include a source assembly, such as source assembly 200 illustrated in FIG. 2. The source assembly can generate an optical signal indicative of the downhole data and can transmit the optical signal towards the surface tools unit 114 via the fiber optic cable. At the surface, a receiver assembly, such as receiver assembly 202 depicted in FIG. 2, can be included in surface tools unit 114 and can receive the optical signal from the source assembly. The receiver assembly can be an adaptive feedback receiver assembly which can detect and match the phase of the optical signal received from the source assembly. Once received, the optical signal can be decoded and stored at the surface, for instance at a processor coupled (wired or wirelessly) to the receiver assembly housed within surface tools unit 114, and/or supplied to or stored within various instruments at the surface of the rig 100.

Alternatively or in addition, surface tools unit 114 can include a source assembly (e.g. source assembly 200) to communicate data to downhole tools unit 112. The source assembly can generate and transmit an optical signal via the fiber optic cable to a receiver assembly (e.g. receiver assembly 202) included in downhole tools unit 112. As previously discussed, the receiver assembly can be an adaptive feedback receiver assembly which can detect and match the phase of the optical signal received from the source assembly. Once received, the optical signal can be decoded and stored, for instance at a processor coupled (wired or wirelessly) to the receiver assembly housed at a downhole location within downhole tools unit 112 or a processor coupled (wired or wirelessly) to the source assembly housed at a surface location within surface tools unit 114, or one or more processors in both a downhole location within downhole tools unit 112 and a surface location within surface tools unit 114. The optical signal can also be supplied to or stored within various instruments at a downhole location of the wellbore 108.

Although the disclosure above was described with respect to the downhole tools unit 112 and surface tools unit 114 having a source assembly and/or a receiver assembly, the presently disclosed telemetry system using adaptive feedback can be suitably employed with any configuration of optical communication between a downhole and a surface location, as well as for optical communications between downhole locations. For example, one or more source assembly (e.g., source assembly 200) and all its associated components can be located at a surface location of wellbore 108 (e.g., within surface tools unit 114), at a downhole location of wellbore 108 (e.g., within downhole tools unit 112), or both at a surface location and a downhole location of wellbore 108. Furthermore, one or more receiver assembly (e.g., receiver assembly 202) and all its associated components can be located at a surface location of wellbore 108 (e.g., within surface tools unit 114), at a downhole location of wellbore 108 (e.g., within downhole tools unit 112), or both at a surface location and a downhole location of wellbore 108. Moreover, individual components of the source assembly (e.g., source assembly 200) and the receiver assembly (e.g., receiver assembly 202) can be located together or separately at a surface location of wellbore 108 and/or a downhole location within wellbore 108.

FIG. 2 illustrates a schematic diagram showing the source and receiver components in a telemetry system using adaptive feedback. A source assembly 200 can include a light source 204 coupled to an encoder 206. In general, light source 204 can be any suitable laser or other phase coherent light source capable of transmitting an optical signal through a fiber optic cable, but can be selected based on the location of the source assembly 200. When the source assembly 200 is located at a surface location (e.g. the surface of a wellbore), light source 204 can be one or more of a diode laser, a dye laser, a gas laser, a chemical laser, a metal vapor laser, a frequency comb, super-continuum light source, a fiber laser, a broadband source coupled to a fiber Bragg grating, and a solid state laser. When the source assembly 200 is located at a downhole location of a wellbore, light source 204 can be one or more of a quantum dot laser, a vertical-cavity surface-emitting laser, a cooled electroabsorption modulated laser, a frequency comb, super-continuum light source, a fiber laser, a broadband source coupled to a fiber Bragg grating.

To transmit data from source assembly 200, encoder 206 can modulate the beam of light emitted by light source 204. Encoder 206 can be a phase modulator, and the phase of the optical signal output by encoder 206 can be indicative of the data being transmitted from the source assembly 200. Encoder 206 can use any phase modulation technique known in the art to encode the data being transmitted, including phase-shift keying (PSK), continuous phase modulation (CPM), and the like. To achieve a higher bit rate when transmitting data, encoder 206 can use a phase encoding technique that utilizes the entire range of phase values between 0 radians and 2π radians. To do so, encoder 206 can apply a voltage across an electro-optic crystal to produce a phase shift in the light passing through. As a non-limiting example, the phase shift of the light, Δφ, can be directly related to the voltage V applied by the encoder 206 through equation (1) below, where λ is the wavelength, n is the index of refraction, and A is a constant based on the material and geometry of the encoder 206.

$$\Delta \phi = -A \frac{V}{\lambda} n^3 \tag{1}$$

Once an optical signal is generated by light source 204 and encoder 206 within source assembly 200, it can be transmitted to receiver assembly 202 via an optical communication channel 208. The optical communication channel 208 can be any suitable link, such as a fiber optic cable, which transports the optical signal from the source assembly 200 to the receiver assembly 202. The optical communication channel 208 can be single mode, multimode, and/or polarization maintaining. Optical communication channel 208 can be configured to transport any wavelength between 750 nm and 5000 nm. More specifically, optical communication channel 208 can be configured to transport wavelengths of 850 nm, 905 nm, 980 nm, 1310 nm, and 1550 nm.

Upon receipt at receiver assembly 202, the incoming optical signal can undergo detection to produce an output that is related to its phase. This detection can be implemented using any suitable optical detection process, such as optical heterodyne detection, homodyne detection, balanced homodyne detection, and the like. In systems employing balanced homodyne detection, the incoming optical signal can be mixed with a signal from a local oscillator 212 via coupler 210 to produce interferences signals. The local oscillator 212 can have the same frequency as the incoming optical signal and can have a known phase. The coupler 210 can be a beam splitter with 50% reflectivity (i.e. a 50:50 beam splitter) or any other interferometer known in the art capable of mixing the incoming optical signal with the signal from local oscillator 212.

After passing through coupler 210, the interference signals can enter detectors 220 and 222. Detectors 220 and 222 can be photodetectors, such as photodiodes, and can produce output signals proportional to the photocurrent of the respective interference signal. A difference amplifier 224 can take the difference between the outputs of detectors 220 and 222 and can output a difference photocurrent signal to processor 216. The difference amplifier 224 can remove a common mode term from the outputs of detectors 220 and 222. The difference photocurrent signal can be a scalar function corresponding to the phase of the incoming signal from the source assembly 200. As a non-limiting example, the difference photocurrent signal output by difference amplifier 224 can be proportional to $\cos(\varphi(t)-\theta)$, where $\varphi(t)$ is the incoming signal from source assembly 200 whose phase is to be estimated and θ is the known phase of local oscillator 212.

Processor 216, which can be a field-programmable gate array (FPGA), can process the difference photocurrent signal and can estimate the phase of the optical signal received from source assembly 200. Processor 216 can also determine the difference between the phase of the optical signal and the phase of the local oscillator. Processor 216 can be located at a surface location (e.g., a surface of a wellbore), a downhole location (e.g., downhole within a wellbore), or both a surface location (e.g., a surface of a wellbore) and a downhole location (e.g., downhole within a wellbore). After estimating the phase, processor 216 can utilize encoder 214, which can be a phase modulator, to adjust the phase of the local oscillator 212. Encoder 214 can be located at a surface location (e.g., a surface of a wellbore), a downhole location (e.g., downhole within a wellbore), or both a surface location (e.g., a surface of a wellbore) and a downhole location (e.g., downhole within a wellbore). Once the phase of the local oscillator 212 is adjusted, a new difference photocurrent signal can be produced and fed back to processor 216 for evaluation. This process of estimating the phase of the incoming optical signal and adjusting the phase of the local oscillator 212 can be repeated as described in FIG. 3 and FIG. 4 to determine the best estimate of the phase. After determining the best estimate of the phase, or after each phase estimate, processor 216 can provide the phase estimate to instruments 218 for decoding, communicating to source assembly 200, or otherwise. Further, processor 216 can decode the optical signal received from source assembly 200 to provide to instruments 218.

Figure 3:
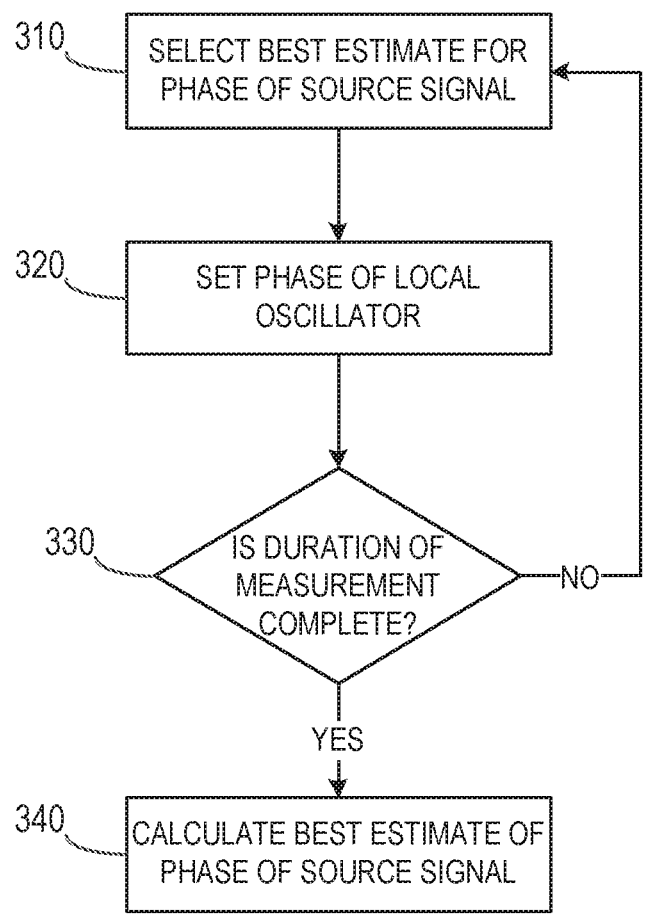
FIG. 3 illustrates a flow chart for estimating the phase of a source signal in accordance with an exemplary embodiment.

FIG. 3 illustrates a flow chart for estimating the phase of a source signal in accordance with an exemplary embodiment. The exemplary method is provided by way of example, as there are a variety of ways to carry out the method. The method can be carried out using the configurations illustrated in FIGS. 1 and 2, by way of example. Each block shown in FIG. 3 represents one or more processes, methods or subroutines, carried out in the exemplary method.

The exemplary method can begin at block 310 by selecting a best estimate for the phase of the source signal. The best estimate for the phase of the source signal can be chosen as the best estimate at time t, given by $\varphi_{est}(t)$, from the current measurement data available at the time $t\{i(u): 0 \leq u \leq t\}$.

At block 320, set the local oscillator phase (θ) such that θ→θ(t)+π/2. The oscillator phase can also be set such that θ→θ(t)+C, where C is a calculated or predetermined constant value. The value of C can be selected to increase the signal to noise ratio and/or to maximize the sensitivity of the measurement of the signal whose phase is to be estimated. The signal whose phase to be estimated, $\varphi_{est}$, has an unknown phase but the same frequency as the local oscillator, which has a known phase that is set according to the method of FIG. 3.

At block 330, steps 310 and 320 are completed until the duration of the measurement is complete. Steps 310 and 320 can be repeated for each of t+Δt, t+2λt, t+3Δt, etc., for the duration of the measurement, where Δt is the smallest time step that can be processed by the processor (for example, processor 216 of FIG. 2). At block 330, after the duration of the measurement is complete, the method continues to block 340 to calculate the best estimate of the phase of the source signal.

Figure 4:
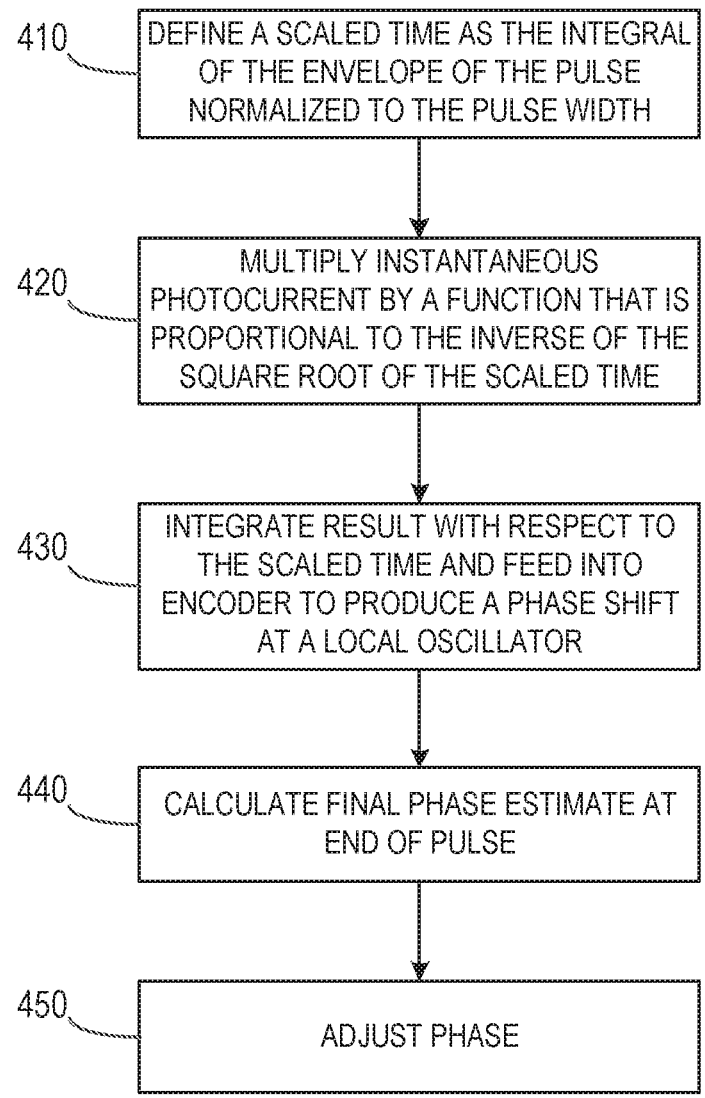
FIG. 4 illustrates a flow chart for adjusting the phase of a source signal in accordance with an exemplary embodiment.

By integrating the phase change over time, through for example steps 310 and 320, abrupt changes in phase can be captured by the method. Advantageously, this allows the system and method of the present disclosure to operate with a very weak signal, for example only a few photons, by the adaptive feedback system, to detect the phase. At block 340, the best estimate of φ is calculated once the measurement is complete. The blocks 310, 320, 330 and 340 comprise a feedback protocol. FIG. 4 illustrates an example method for adjusting the phase once the feedback protocol has been established. Once the phase is established, it can be adjusted, through commands to downhole tools, to ensure that the uplink telemetry is always transmitting at the highest signal. For example, degradation in signal quality can result from slightly unbalanced receivers that result from strain, temperature or mismatched fiber path lengths. Adjusting the phase allows for improving signal quality of a potentially degraded or attenuated cable or other fiber communication line.

FIG. 4 illustrates a flow chart for adjusting the phase of a source signal in accordance with an exemplary embodiment. The method can begin at block 410 and define a scaled time for the method. The scaled time can be defined as the integral of the envelope of the pulse normalized to the pulse width, as represented by the equation below:

$$v = \int_0^t u(s)ds$$

Where u(t) is the envelope of the pulse normalized such that $\int_0^T u(t)dt=1$, where T is the pulse width, and a feedback algorithm is provided by blocks 420 through 440.

At block 420, the instantaneous photocurrent i(t) is multiplied by a function that is proportional to the inverse of the square root of the scaled time, represented by the following equation:

$$\sqrt{\int_0^t u(s)ds}$$

At block 430, the result of block 420 is integrated with respect to the scaled time, producing an integrated phase difference. The integrated phase difference is fed back to the electro-optical modulator (for example, encoder 214 in FIG. 2), producing a phase shift of the local oscillator (for example, local oscillator 212 in FIG. 2). By using an FPGA as the processor, fast computation of the feedback can be achieved.

At block 440, at the end of the pulse, the final phase estimate is chosen to be $$\phi_{est}(T) = \arg(A + BA^*); A = \exp\left[i\int_0^1 u\frac{i(v)}{\sqrt{v}}dv\right];$$

$$B = -\int_0^1 e^{2i(\phi_{est}(v)+\pi/2)}dv$$

With the phase established at block 440, it can be adjusted at block 450, through commands to downhole tools, to ensure that the uplink telemetry is always transmitting at the highest signal.

Dual-Polarization Redundancy

The bit error rate for the feedback mechanism in accordance with the present disclosure can be reduced yet further by utilizing signals that operate on orthogonal polarizations. Traditionally, a single linear polarization of the light single is passed through the phase modulator (for example, encoder 206 of FIG. 2) in order to ensure maximum modulation. If the light travels along the single-mode fiber, however, the signal may become depolarized, and the polarization of the received light will be unknown at the receiving end. Occasionally, the polarization of the light signal will be such that it will not pass through the encoder, for example due to the presence of a polarizer, or may be strongly attenuated, for example due to straining on the fiber cables. To ensure the presence of a signal, dual polarization states may be used.

Light signals that are in orthogonal polarization states will stay in states that are orthogonal over long distances as long as the wavelength of light in the two polarization states are similar. Thus, if two light signals are provided, either by using one light source with light split and recombined with a polarization rotation, or using two sources well matched in frequency but combined at difference polarization, a return signal is ensured, regardless of the demodulation that occurs.

In another example embodiment, the coupler (for example, coupler 210 of FIG. 20) can be replaced with a 2×8 mixer (for example, Optoplex Coherent Mixer) that splits the X and Y directions of the signal to achieve separate polarization. This example would include a greater number of detectors (for example four) and an extra differential amplifier to detect the phase difference between the polarized signals.

Figure 5A:
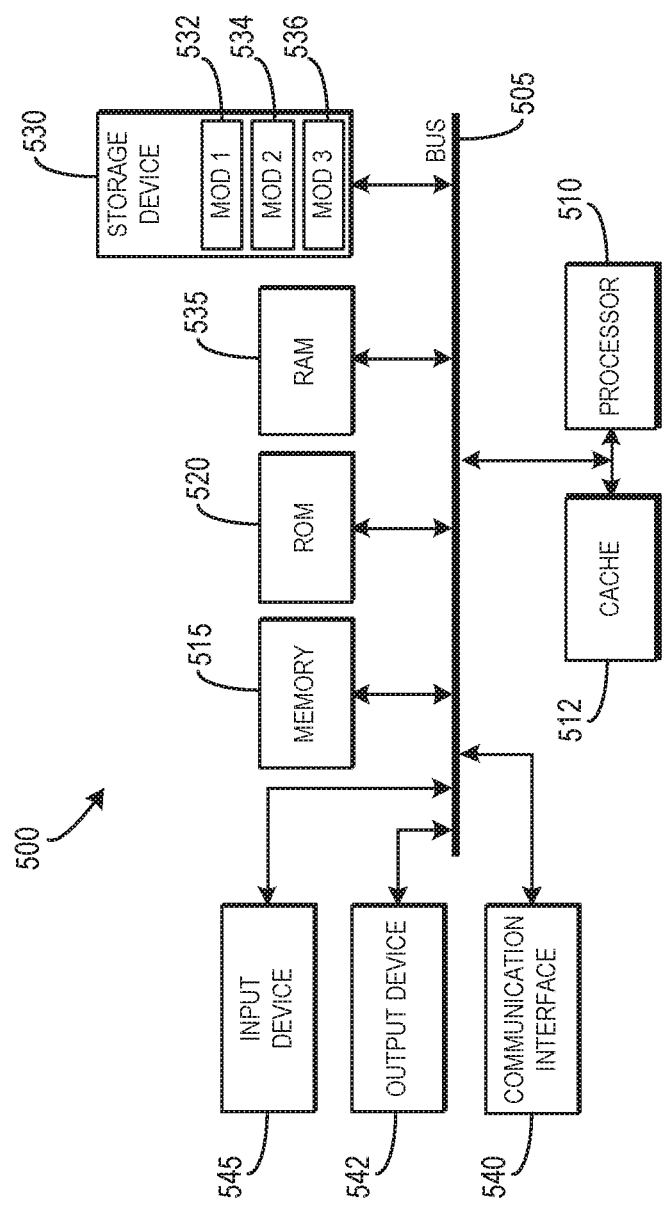
FIG. 5A and FIG. 5B illustrate schematic diagrams of example system embodiments.
Figure 5B:
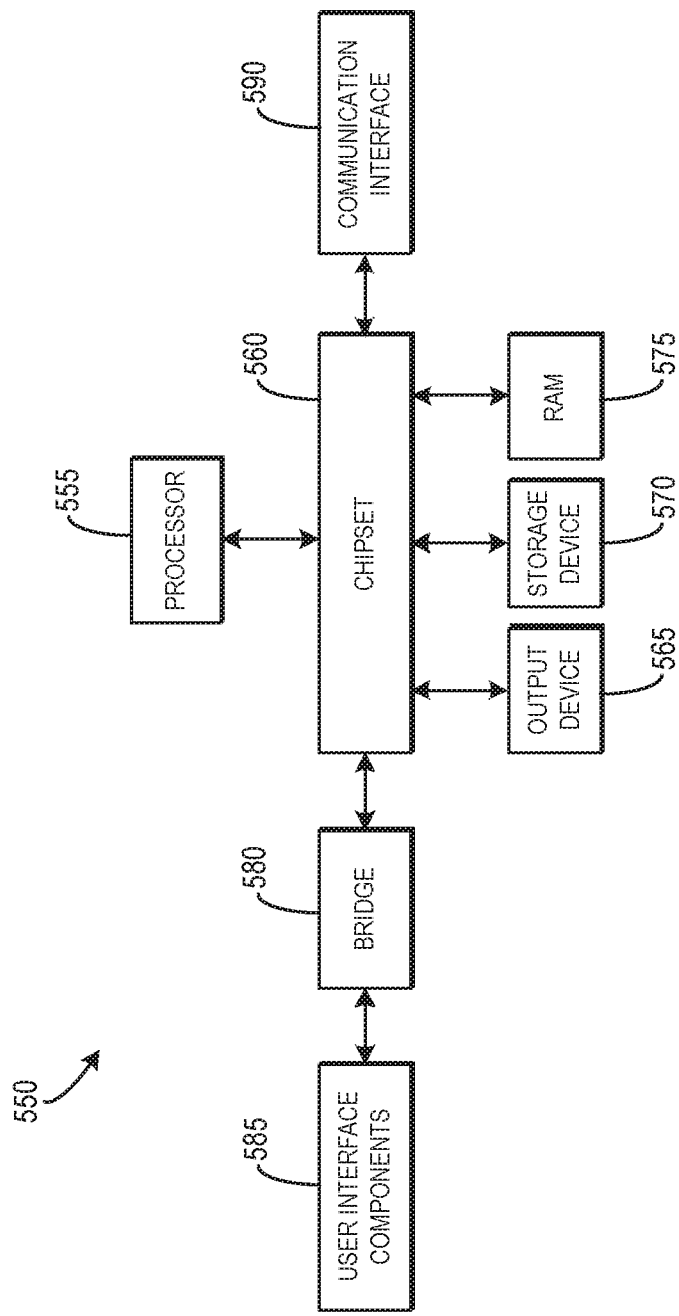

FIG. 5A and FIG. 5B illustrate example system embodiments. The more appropriate embodiment will be apparent to those of ordinary skill in the art when practicing the present technology. Persons of ordinary skill in the art will also readily appreciate that other system embodiments are possible.

FIG. 5A illustrates a conventional system bus computing system architecture 500 wherein the components of the system are in electrical, optical (photonic) communication with each other using a bus 505. System 500 can include a processing unit (CPU, GPU, or processor) 510 and a system bus 505 that couples various system components including the system memory 515, such as read only memory (ROM) 520 and random access memory (RAM) 525, to the processor 510. The system 500 can include a cache of high-speed memory connected directly with, in close proximity to, or integrated as part of the processor 510. The system 500 can copy data from the memory 515 and/or the storage device 530 to the cache 512 for quick access by the processor 510. In this way, the cache can provide a performance boost that avoids processor 510 delays while waiting for data. These and other modules can control or be configured to control the processor 510 to perform various actions. Other system memory 515 may be available for use as well. The memory 515 can include multiple different types of memory with different performance characteristics. The processor 510 can include any general purpose processor and a hardware module or software module, such as module 1 532, module 2 534, and module 3 536 stored in storage device 530, configured to control the processor 510 as well as a special-purpose processor where software instructions are incorporated into the actual processor design. The processor 510 may essentially be a completely self-contained computing system, containing multiple cores or processors, a bus, memory controller, cache, etc. A multi-core processor may be symmetric or asymmetric.

To enable user interaction with the computing device 500, an input device 545 can represent any number of input mechanisms, such as a microphone for speech, a touch-sensitive screen for gesture or graphical input, keyboard, mouse, motion input, speech and so forth. An output device 542 can also be one or more of a number of output mechanisms known to those of skill in the art. In some instances, multimodal systems can enable a user to provide multiple types of input to communicate with the computing device 500. The communications interface 540 can generally govern and manage the user input and system output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof.

The storage device 530 can include software modules 532, 534, 536 for controlling the processor 510. Other hardware or software modules are contemplated. The storage device 530 can be connected to the system bus 505. In one aspect, a hardware module that performs a particular function can include the software component stored in a computer-readable medium in connection with the necessary hardware components, such as the processor 510, bus 505, display 535, and so forth, to carry out the function.

FIG. 5B illustrates an example computer system 550 having a chipset architecture that can be used in executing the described method and generating and displaying a graphical user interface (GUI). Computer system 550 can be computer hardware, software, and firmware that can be used to implement the disclosed technology. System 550 can include a processor 555, representative of any number of physically and/or logically distinct resources capable of executing software, firmware, and hardware configured to perform identified computations. Processor 555 can communicate with a chipset 560 that can control input to and output from processor 555. Chipset 560 can output information to output device 565, such as a display, and can read and write information to storage device 570, which can include magnetic media, and solid state media. Chipset 560 can also read data from and write data to RAM 575. A bridge 580 for interfacing with a variety of user interface components 585 can be provided for interfacing with chipset 560. Such user interface components 585 can include a keyboard, a microphone, touch detection and processing circuitry, a pointing device, such as a mouse, and so on. In general, inputs to system 550 can come from any of a variety of sources, machine generated and/or human generated.

Chipset 560 can also interface with one or more communication interfaces 590 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 555 analyzing data stored in storage 570 or 575. Further, the machine can receive inputs from a user via user interface components 585 and execute appropriate functions, such as browsing functions by interpreting these inputs using processor 555.

It can be appreciated that systems 500 and 550 can have more than one processor 510 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

The computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the aforementioned description can be implemented using computer-executable instructions that are stored or otherwise available from computer readable media. Such instructions can comprise instructions and data which cause or otherwise configure a general purpose computer, special purpose computer, or special purpose processing device to perform a certain function or group of functions. Portions of computer resources used can be accessible over a network. The computer executable instructions may be binaries, intermediate format instructions such as assembly language, firmware, or source code. Computer-readable media that may be used to store instructions, information used, and/or information created during methods according to the aforementioned description include magnetic or optical disks, flash memory, USB devices provided with non-volatile memory, networked storage devices, and so on.

Devices implementing methods according to these disclosures can comprise hardware, firmware and/or software, and can take any of a variety of form factors. Such form factors can include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device.

The instructions, media for conveying such instructions, computing resources for executing them, and other structures for supporting such computing resources are means for providing the functions described in these disclosures.

Statements of the Disclosure Include:

Statement 1: A feedback telemetry system, the feedback telemetry system comprising: a source assembly comprising: a source device that transmits a light signal having a first phase, and a receiving assembly comprising: an oscillator that transmits an oscillator signal having a second phase; a coupler that couples the light signal with the oscillator signal to produce a first interference signal and a second interference signal; a detector that produces an output indicative of the first interference signal and the second interference signal; a difference amplifier that receives the output from the detector and determines a difference between the first interference signal and the second interference signal; a processor that receives the difference between the first interference signal and the second interference signal and estimates the first phase of the light signal based on the difference; and an encoder that receives the estimate of first phase of the light signal and adjusts the second phase of the oscillator.

Statement 2: The feedback telemetry system according to Statement 1, wherein the source assembly is located on a surface outside of the wellbore, and the receiving assembly is located downhole within a wellbore.

Statement 3: The feedback telemetry system according to Statement 1 or Statement 2, wherein the source comprises one or more of: a diode laser, a dye laser, a gas laser, a chemical laser, a metal-vapor laser, a solid state laser, a frequency comb, a super-continuum light source, a fiber laser, and a broadband source coupled to a fiber Bragg grating.

Statement 4: The feedback telemetry system according to any one of Statements 1 to 3, wherein the source assembly is located downhole within the wellbore, and the receiving assembly is located on a ground surface of the wellbore.

Statement 5: The feedback telemetry system according to any one of Statements 1 to 4, wherein the source comprises one or more of: a quantum dot laser, a vertical-cavity surface-emitting laser, a cooled electroabsorption modulated laser, a frequency comb, a super-continuum light source, a fiber laser, and a broadband source coupled to a fiber Bragg grating.

Statement 6: The feedback telemetry system according to any one of Statements 1 to 5, wherein the source comprises a laser.

Statement 7: The feedback telemetry system according to any one of Statements 1 to 6, further comprising a channel that connects the source assembly and the receiver assembly, wherein the channel is a fiber optic cable that transmits the light signal from the source assembly to the receiver assembly.

Statement 8: The feedback telemetry system according to any one of Statements 1 to 7, wherein the detector is located on a ground surface of the wellbore or downhole within the wellbore.

Statement 9: The feedback telemetry system according to any one of Statements 1 to 8, wherein the source utilizes dual-polarization redundancy in transmitting the light signal.

Statement 10: The feedback telemetry system according to any one of Statements 1 to 9, wherein the light source comprises a single light, and the light source utilizes dual-polarization redundancy by splitting the light signal from the single light source into two light signals and recombining the two light signals with a polarization rotation.

Statement 11: The feedback telemetry system according to any one of Statements 1 to 9, wherein the light source utilizes dual-polarization redundancy by transmitting a first light signal from a first source, and a second light signal from a second source, where the first light signal and the second light signal are approximately matched in frequency and combined at different polarizations.

Statement 12: A method of using adaptive feedback in downhole telemetry, the method comprising: coupling a source signal having an unknown phase with an oscillator signal having a known phase, the source signal transmitted from a light source of a source assembly, the oscillator signal coupled at a receiving assembly at a surface outside the wellbore, the source signal and the oscillator signal having a same frequency; and detecting a phase difference between the unknown phase and the known phase.

Statement 13: The method according to Statement 12, further comprising providing the phase difference to an encoder that modulates the known phase of the local oscillator so that the known phase is the sum of $\pi/2$ and the unknown phase of the source signal.

Statement 14: The method according to Statement 12 or Statement 13, further comprising providing the phase difference to at least one downhole tool unit that resides downhole.

Statement 15: The method according to any one of Statements 12 to 14, further comprising providing the phase difference to a processing unit for further storage.

Statement 16: The method according to any one of Statements 12 to 15, wherein detecting the phase difference comprises defining a scaled time as an integral of an envelope of a pulse of a light signal from a light source; multiplying a photocurrent of the light signal by a function that is proportional to the inverse of the square root of the scaled time to provide a result; integrating the result with respect to the scaled time to provide an integrated phase difference; and providing the integrated phase difference to an encoder to produce a phase shift at a local oscillator.

Statement 17: A method of using adaptive feedback in downhole telemetry, the method comprising: receiving, at a detector of a receiver assembly, a first interference signal and a second interference signal from a mixing of an oscillator signal residing at the receiver assembly and a light signal transmitted from a light source at a source assembly; providing the first interference signal and second interference signal to a differential amplifier to determine a difference between the first interference signal and second interference signal; and estimating, by a processor, estimating, by a processor, a phase difference between a first phase of the light signal and a second phase of the oscillator signal based on the difference between the first and second interference signals based on the difference between the first interference signal and the second interference signal.

Statement 18: The method according to Statement 17, further comprising outputting the phase difference to an encoder of the receiver assembly to modulate the oscillator signal so that the second phase of the oscillator signal is the first phase of the light signal plus $\pi/2$.

Statement 19: The method according to Statement 17 or Statement 18, further comprising outputting the phase difference to at least one downhole instrument or storing the phase difference.

Statement 20: The method according to any one of Statements 17 to 19, further comprising utilizing dual-polarization redundancy in transmitting the light signal.

Although a variety of information was used to explain aspects within the scope of the appended claims, no limitation of the claims should be implied based on particular features or arrangements, as one of ordinary skill would be able to derive a wide variety of implementations. Further and although some subject matter may have been described in language specific to structural features and/or method steps, it is to be understood that the subject matter defined in the appended claims is not necessarily limited to these described features or acts. Such functionality can be distributed differently or performed in components other than those identified herein. Rather, the described features and steps are disclosed as possible components of systems and methods within the scope of the appended claims. Moreover, claim language reciting "at least one of" a set indicates that one member of the set or multiple members of the set satisfy the claim.

What is claimed is:

1. A feedback telemetry system, comprising:
   at least one downhole tool comprising a source assembly, the source assembly further comprising:
      a source device that transmits a light signal having a first phase,
      wherein the source assembly utilizes dual-polarization redundancy in transmitting the light signal;
   at least one telemetry unit coupled with the at least one downhole tool and operable to implement an adaptive feedback system; and
   a receiving assembly communicatively coupled with the source assembly, the receiving assembly comprising:
      an oscillator that transmits an oscillator signal having a second phase;
      a coupler that mixes the light signal with the oscillator signal to produce a first interference signal and a second interference signal;
      a detector that produces an output indicative of the first interference signal and the second interference signal;
      a difference amplifier that receives the output from the detector and determines a difference between the first interference signal and the second interference signal;
      a processor that receives the difference between the first interference signal and the second interference signal and estimates the first phase of the light signal based on the difference; and
      an encoder that receives the estimate of the first phase of the light signal and adjusts the second phase of the oscillator signal,
      wherein the difference between the first interference signal and the second interference signal is proportional to $\cos(\Phi(t)-\Theta)$,
      wherein $\Phi(t)$ is the light signal transmitted from the source device and $\Theta$ is the second phase of the oscillator signal.

2. The feedback system of claim 1, wherein the source assembly is located on a surface outside of a wellbore, and the receiving assembly is located downhole within the wellbore.

3. The feedback system of claim 2, wherein the source assembly comprises one or more of: a diode laser, a dye laser, a gas laser, a chemical laser, a metal-vapor laser, a solid state laser, a frequency comb, a super-continuum light source, a fiber laser, and a broadband source coupled to a fiber Bragg grating.

4. The feedback system of claim 1, wherein the source assembly is located downhole within the wellbore, and the receiving assembly is located on a ground surface of the wellbore.

5. The feedback system of claim 4, wherein the source assembly comprises one or more of: a quantum dot laser, a vertical-cavity surface-emitting laser, a cooled electroabsorption modulated laser, a frequency comb, a super-continuum light source, a fiber laser, and a broadband source coupled to a fiber Bragg grating.

6. The feedback system of claim 1, wherein the source assembly comprises a laser.

7. The feedback system of claim 1, further comprising a channel that connects the source assembly and the receiver assembly, wherein the channel is a fiber optic cable that transmits the light signal from the source assembly to the receiver assembly.

8. The feedback system of claim 1, wherein the detector is located on a ground surface of the wellbore or downhole within the wellbore.

9. The feedback system of claim 1, wherein the light source comprises a single light source, and the light source utilizes the dual-polarization redundancy by splitting the light signal from the single light source into two light signals and recombining the two light signals with a polarization rotation.

10. The feedback system of claim 1, wherein the light source utilizes the dual-polarization redundancy by transmitting a first light signal from a first source, and a second light signal from a second source, where the first light signal and the second light signal are approximately matched in frequency and combined at different polarizations.

11. A method of using adaptive feedback in downhole telemetry, the method comprising:
    providing at least one downhole tool unit comprising a source assembly and coupled with a telemetry unit, the source assembly communicatively coupled with a receiving assembly;
    mixing a source signal having an unknown phase with an oscillator signal having a known phase, the source signal transmitted from a light source of the source assembly, the oscillator signal coupled with the source signal at the receiving assembly at a surface outside a wellbore, the source signal and the oscillator signal having a same frequency; and
    detecting a phase difference between the unknown phase of the source signal and the known phase of the oscillator signal,
    wherein the phase difference between the unknown phase of the source signal and the known phase of the oscillator signal is proportional to $\cos(\Phi(t)-\Theta)$,
    wherein $\Phi(t)$ is the light signal transmitted from the source device and $\Theta$ is the second phase of the oscillator signal, and
    wherein the light source utilizes dual-polarization redundancy in transmitting the source signal.

12. The method of claim 11, further comprising:
    providing the phase difference to an encoder that modulates the known phase of the local oscillator so that the known phase is the sum of a constant and the unknown phase of the source signal.

13. The method of claim 11, further comprising:
    providing the phase difference to the at least one downhole tool unit that resides downhole.

14. The method of claim 11, wherein detecting the phase difference comprises:
    defining a scaled time as an integral of an envelope of a pulse of a light signal from a light source;
    multiplying a photocurrent of the source signal by a function that is proportional to the inverse of the square root of the scaled time to provide a result; integrating the result with respect to the scaled time to provide an integrated phase difference; and
    providing the integrated phase difference to an encoder to produce a phase shift at a local oscillator.

15. A method of using adaptive feedback in downhole telemetry, the method comprising:
- providing at least one downhole instrument comprising a source assembly and coupled with a telemetry unit, wherein the source assembly is further communicatively coupled with a receiving assembly;
- utilizing dual-polarization redundancy to transmit a light signal from a light source at the source assembly;
- receiving, at a detector of the receiver assembly, a first interference signal and a second interference signal from a mixing of an oscillator signal residing at the receiver assembly and the light signal;
- providing the first interference signal and second interference signal to a differential amplifier to determine a difference between the first interference signal and second interference signal; and
- estimating, by a processor, a phase difference between a first phase of the light signal and a second phase of the oscillator signal based on the difference between the first interference signal and the second interference signal,
- wherein the difference between the first interference signal and the second interference signal is proportional to $\cos(\Phi(t)-\Theta)$,
- wherein $\Phi(t)$ is the light signal transmitted from the source device and $\Theta$ is the second phase of the oscillator signal.

16. The method of claim 15, further comprising: outputting the phase difference to an encoder of the receiver assembly to modulate the oscillator signal so that the second phase of the oscillator signal is the first phase of the light signal plus $\pi/2$.

17. The method of claim 15, further comprising: outputting the phase difference to the at least one downhole instrument or storing the phase difference.

18. The method of claim 17, wherein the downhole instrument is a wireline tool disposed within a wellbore via a wireline.

* * * * *